United States Patent
Schirrmeister et al.

(10) Patent No.: US 8,840,711 B2
(45) Date of Patent: Sep. 23, 2014

(54) METHOD FOR POTTING CERAMIC CAPILLARY MEMBRANES

(75) Inventors: Steffen Schirrmeister, Muelheim an der Ruhr (DE); Bernd Langanke, Holzwickede (DE); Thomas Schiestel, Stuttgart (DE); Björn Hoting, Berlin (DE)

(73) Assignees: Thyssenkrupp Uhde GmbH, Dortmund (DE); Borsig Process Heat Exchanger GmbH, Berlin (DE)

( * ) Notice: Subject to any disclaimer, the term of this patent is extended or adjusted under 35 U.S.C. 154(b) by 296 days.

(21) Appl. No.: 13/393,444

(22) PCT Filed: Aug. 25, 2010

(86) PCT No.: PCT/EP2010/005193
§ 371 (c)(1),
(2), (4) Date: Apr. 2, 2012

(87) PCT Pub. No.: WO2011/023371
PCT Pub. Date: Mar. 3, 2011

(65) Prior Publication Data
US 2013/0042763 A1    Feb. 21, 2013

(30) Foreign Application Priority Data

Aug. 31, 2009 (DE) .......... 10 2009 038 814

(51) Int. Cl.
*B01D 53/22* (2006.01)
*B01D 71/04* (2006.01)
(Continued)

(52) U.S. Cl.
CPC .............. *C04B 37/005* (2013.01); *B01D 53/22* (2013.01); *C03C 8/04* (2013.01); *B01D 71/024* (2013.01); *C04B 37/025* (2013.01);
(Continued)

(58) Field of Classification Search
CPC ........ B01D 53/22; B01D 69/02; B01D 63/06; B01D 71/02; B01D 2313/025; B01D 2313/04; B01D 2313/06; B01D 2313/13; B01D 2313/21; B01D 63/022; B01D 63/023; B01D 71/024; B01J 19/2425; B29C 70/745; C04B 37/00; C04B 37/04; C04B 37/005
USPC ................ 96/4, 8, 10, 11; 95/54, 45; 427/309
See application file for complete search history.

(56) References Cited

U.S. PATENT DOCUMENTS

| 5,820,655 A | 10/1998 | Gottzmann et al. |
| 6,174,490 B1 | 1/2001 | Brinkman et al. |

(Continued)

FOREIGN PATENT DOCUMENTS

| DE | 4425209 | 1/1996 |
| DE | 10112863 | 11/2002 |

(Continued)

OTHER PUBLICATIONS

International Search Report for PCT/EP2010/005193, English translation attached to original, Both completed by the European Patent Office on Mar. 28, 2011, 7 Pages.

(Continued)

*Primary Examiner* — Jason M Greene
(74) *Attorney, Agent, or Firm* — Brooks Kushman P.C.

(57) ABSTRACT

A modular element having a high-temperature stable main body, including at least one metallic or ceramic plate, which has at least one through-going aperture for the insertion of a ceramic capillary membrane and at least one potting in the form of a sufficiently gas-tight and high-temperature stable joint between the metallic or ceramic plate and the ceramic capillary membrane. The through-going aperture of the metallic or ceramic plate having an extension for accommodating the sufficiently gas-tight and high-temperature stable joint on at least one side of the metallic or ceramic plate.

34 Claims, 5 Drawing Sheets

Figure 1:
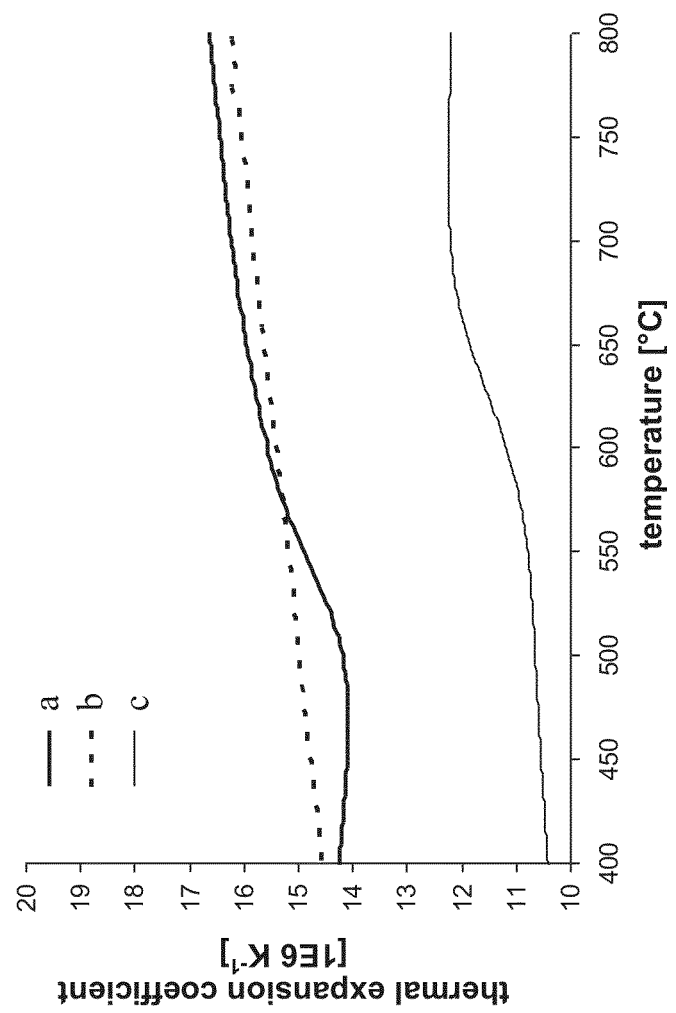

(51) Int. Cl.
*B01D 53/22* (2006.01)
*B01D 71/04* (2006.01)
*B01D 69/08* (2006.01)
*B05D 3/00* (2006.01)
*C03C 8/04* (2006.01)
*C04B 37/00* (2006.01)
*B01D 71/02* (2006.01)
*C04B 37/02* (2006.01)
*C03C 8/06* (2006.01)
*C04B 37/04* (2006.01)
*B01J 19/24* (2006.01)
*C03C 8/24* (2006.01)
*C01B 13/02* (2006.01)
*B01D 63/02* (2006.01)

(52) U.S. Cl.
CPC ............... *C03C 8/06* (2013.01); *C04B 2237/54* (2013.01); *C04B 37/045* (2013.01); *C04B 2237/10* (2013.01); *C04B 2235/656* (2013.01); *B01J 19/2475* (2013.01); *C04B 2235/6584* (2013.01); *C03C 8/24* (2013.01); *C01B 13/0255* (2013.01); *B01D 63/022* (2013.01); *C01B 2210/0046* (2013.01); *C04B 2235/6562* (2013.01); *B01D 63/023* (2013.01)
USPC ................ 96/10; 96/8; 96/11; 95/45; 95/54; 427/309

(56) References Cited

U.S. PATENT DOCUMENTS

| | | | |
|---|---|---|---|
| 6,214,226 B1 * | 4/2001 | Kobayashi et al. | 210/500.23 |
| 6,270,714 B1 | 8/2001 | Azran et al. | |
| 6,348,427 B1 | 2/2002 | Hamada et al. | |
| 6,887,304 B2 | 5/2005 | Stroh et al. | |
| 7,866,486 B2 | 1/2011 | Werth et al. | |
| 8,246,827 B2 * | 8/2012 | Chen et al. | 210/321.8 |
| 2001/0013272 A1 * | 8/2001 | Blase et al. | 96/8 |
| 2006/0019813 A1 | 1/2006 | Yoshii | |
| 2008/0152893 A1 | 6/2008 | Stroh et al. | |
| 2009/0272266 A1 | 11/2009 | Werth et al. | |

FOREIGN PATENT DOCUMENTS

| | | | |
|---|---|---|---|
| DE | 102005005464 | 8/2006 | |
| DE | 102005006571 | 8/2006 | |
| DE | 102006060171 | 6/2008 | |
| EP | 0092839 | 11/1983 | |
| EP | 0092839 A1 * | 11/1983 | B01D 63/06 |
| EP | 0938921 | 9/1999 | |
| EP | 0941759 | 9/1999 | |
| JP | 62252365 | 11/1987 | |
| JP | 6076255 | 9/1994 | |
| JP | 2009-90246 * | 4/2009 | B01D 63/02 |
| JP | 2009090246 | 4/2009 | |
| WO | 2004014530 | 2/2004 | |
| WO | 2005081959 | 9/2005 | |
| WO | 2006089616 | 8/2006 | |

OTHER PUBLICATIONS

Tong et al. Journal of Membrane Science 2002, vol. 203, p. 175-189, "Investigation vof ideal zirconium-doped perovskite-type ceramic membrane materials for oxygen separation."

Teraoka. Solid State Ionics 1991, vol. 48, p. 207-212, "Influence of constituent metal cations in substituted LaCoO3 on mixed conductivity and oxygen permeability."

Teraoka et al. Chemistry Letters 1985, p. 1743-1746, "Oxygen Permeation Through Perovskite-Type Oxides."

Thursfield et al. Journal of Material Science 2004, vol. 14, p. 2475-2485, "The use pf dense mixed ionic and electronic conducting membranes for chemical production."

Schiestel et al. Journal of Membrane Science 2005, vol. 258, p. 1-4, "Hollow fibre perovskite membranes for oxygen separation."

* cited by examiner

METHOD FOR POTTING CERAMIC CAPILLARY MEMBRANES

CROSS-REFERENCE TO RELATED APPLICATION

This application is the U.S. national phase of PCT Appln. No. PCT/EP2010/005193 filed Aug. 25, 2010, which claims priority to DE application 10 2009 038 814.1 filed Aug. 31, 2009 on the disclosures of which are incorporated in their entirety by reference herein.

The invention relates to a modular element comprising a high-temperature stable main body, the high-temperature stable main body including at least one metallic or ceramic plate, which has at least one through-going aperture for the insertion of a ceramic capillary membrane and at least one potting in the form of a sufficiently gas-tight and high-temperature stable joint between the metallic or ceramic plate and the at least one ceramic capillary membrane. In addition, the subject matter of the invention relates to a process for the fabrication of the modular elements claimed. These modular elements are excellently suited for the oxygenation from fluids containing oxygen or for the performance of oxidation reactions.

Ceramic membranes are particularly used in high-temperature processes. They constitute a cost-effective alternative to the cryogenic air separation in the recovery of oxygen, for example, and are utilised in the production of syngas by partial oxidation of hydrocarbons, such as methane, according to the following reaction equation:

$$2CH_4 + O_2 \rightarrow 2CO + 4H_2 \tag{1}$$

Other applications are, for example, the recovery of oxygenated air as described, for instance, in DE 102005 006 571 A1, the oxidative dehydrogenation of hydrocarbons or hydrocarbon derivatives, the oxidative coupling of methane to $C_{2+}$ and the decomposition of water and nitrous oxide.

As known from the state of the art, oxidation reactions are carried out by using oxygen ion-conductive and electron-conductive (mixed conductive) ceramic materials, use being made of a reactor which is divided into two compartments or sections by a mixed conductive membrane. Gas-tight membranes form the basis, which show the ability to selectively conduct oxygen and electrons at temperatures of >800° C. as mentioned, for example, in WO 2006/081959 A1. During operation, an oxygen-supplying gas or gas mixture is fed on one side of the membrane (feed side), whereas a medium to be oxidised is fed on the opposite side of the membrane (permeate side). Such membrane reactors are described, for example, in U.S. Pat. No. 5,820,655 A, DE 10 2005 005 464, DE 10 2005 006 571 and DE 10 2006 060 171.

The permeation of oxygen is carried out from the side of the higher partial pressure (feed side) to the side of the lower partial pressure (permeate side). The transfer of oxygen through the membrane in ionic form according to equation (2)

$$O_2 + 4e^- \rightarrow 2O^{2-} \tag{2}$$

results in a highly selective separation of the oxygen from the feed gas, the said oxygen being obtained in the permeate gas without any impurities, such as nitrogen or noble gases, according to equation (3)

$$2O^{2-} \rightarrow O_2 + 4e^- \tag{3}$$

The oxygen can then react according to equation (1), a driving gradient for the oxygen permeation being maintained on account of the continuous oxygen consumption.

Apart from the membrane composition, the velocity of the oxygen permeation largely depends on the operating conditions (T. Schiestel, M. Kilgus, S. Peter, K. J. Capary, H. Wang, J. Caro, Journal of Membrane Science 2005, 258, 1-4). Among these, the temperature is of special importance as it has generally a linear to exponential impact on the velocity of the oxygen permeation.

As known from the state of the art, typical membrane materials are, for example, from the group of perovskite ($ABO_3$) structures or perovskite-allied structures, fluorite structures ($AO_2$), Aurivillius structures ($[Bi_2O_2][A_{n-1}B_nO_x]$) or brownmillerite structures ($A_2B_2O_5$). Typical examples of systems listed in literature as oxygen-conductive materials or material classes are $La_{1-x}(Ca,Sr,Ba)_xCo_{1-y}Fe_yO_{3-\delta}$, $Ba(Sr)Co_{1-x}Fe_xO_{3-\delta}$, $Sr(Ba)Ti(Zr)_{1-x-y}Co_yFe_xO_{3-\delta}$, $La_{1-x}Sr_xGa_{1-y}Fe_yO_{3-\delta}$, $La_{0.5}Sr_{0.5}MnO_{3-\delta}$, $LaFe(Ni)O_{3-\delta}$, $La_{0.9}Sr_{0.1}FeO_{3-\delta}$ or $BaCo_xFe_yZr_{1-x-y}O_{3-\delta}$ (A. Thursfield et al., Journal of Material Science 2004, 14, 275-285; Y. Teraoka et al., Chemistry Letters 1985, 1743-1746; Y. Teraoka et al., Solid State Ionics 1991, 48, 207-212; J. Tong et al., Journal of Membrane Science 2002, 203, 175-189).

With regard to the use of the said ceramic capillary membranes it is important to integrate them into modular elements individually or in large quantities. Such membrane modules must meet the requirements of resisting high chemical and thermal stress. Furthermore they must be resistant to mechanical stress and be gas-tight. The integration of capillary membranes into modular elements can be implemented by embedding them, or, in other terms, potting them, in a casting compound, also referred to as a potting compound. This method makes it necessary to adapt the potting materials and potting techniques to the requirements.

Optimum compatibility with the ceramic membrane is provided by a casting compound of the same material as the ceramic membrane. However, this compound cannot be sintered in a way that gas-tightness is achieved if it is applied in one single layer only, as the ceramic hollow-fibre membranes will then also undergo irreversible changes.

EP 0 941 759 A1 discloses a process for the fabrication of a hollow-fibre membrane module in the case of which sintered hollow fibres are placed into a casting mould in the form of a perforated plate. A ceramic-containing compound is used as casting material which is subsequently cured in a suitable temperature stage and forms a layer which, when removing the casting mould, keeps the sintered hollow fibres in the requested position.

A process for the fabrication of membrane modules is disclosed by EP 0 938 921 A1 according to which hollow-fibre bundles are placed in a casting mould, a casting resin is injected while submitting the whole entity to a ultrasonic treatment.

Both processes involve the disadvantage that the hollow fibres tend to break especially when the casting mould is removed.

DE 101 12 863 C1 describes a process for the fabrication of a hollow-fibre or capillary membrane module, in which the hollow fibres or capillaries of a ceramic or ceramic-containing material in non-sintered state are placed into a mould structured for containing hollow fibres or capillaries and are cast in the mould by applying a single-layer casting compound. The casting compound does not, however, seal the embedded hollow-fibre or capillary membranes to a degree that gas-tightness is achieved. For this very purpose additional coating layers would have to be applied in a further laborious process step or the module would have to be integrated into a sophisticated device with sealing elements.

Thus, the module described does not provide any joint of long-term stability between the ceramic membranes and the reactor shell.

DE 44 25 209 A1 describes a process for firmly bonded joining of compact, sintered ceramic bodies, in which a green ceramic film is inserted between the two joining faces of the ceramic bodies. DE 10 2005 005 464 A1 discloses membrane reactors, the capillary membranes of which are provided in the form of bundles. The individual fibres lie closely together in bundles and sinter at the surface without auxiliary agents or adhesives being added.

WO2006/089616 describes modules and the fabrication of modules, which are resistant to thermal and mechanical stress and/or gas-tight. These modules comprise hollow-fibre or capillary membranes, a mould and embeddings of casting compound to embed the hollow-fibre or capillary membranes in the mould, the potting consisting of at least three layers of at least two different casting compounds. The disadvantage of this module is the sophisticated layer structure of the potting which is required to achieve the specified characteristics of the module.

Another method for fabricating modular elements which are resistant to thermal and mechanical stress and are gas-tight is to join the ceramic capillary membranes directly with a perforated plate by a potting spread across the entire surface of the mould, the perforated plate constituting an integral component of the module and is not removed again. The problem involved in this solution is the long-term stability of such modules. The materials used are often of different thermal expansion properties, which causes tensions between the materials and thus ruptures and the destruction of the module.

Since the expansion and shrinkage behaviour of the external metallic material often largely differs from that of the rigidly fixed hollow fibre or the hollow-fibre bundle, the brittle and hardly expandable ceramic material will be exposed to extreme stress and frequent damage by heating and cooling processes. The use of certain silicone sealing systems for reducing the problem involves the disadvantage that the said seals do not resist high temperatures so that it is necessary to keep that part of the fibre which is close to the seal in a cooler section of the reactor. This makes design work more complicated.

The technical problem to be solved by the present invention is therefore to provide modules of improved properties, which, under operating conditions, are especially characterised by high long-term stability, resistance to thermal and mechanical stress and, in addition, provide gas-tight sealing.

Surprisingly it has been found that modular elements of long-term stability are particularly obtained if the through-going apertures of the plate to be integrated into the high-temperature stable main body are provided with an extension for accommodating a joint of sufficient gas-tightness and high-temperature stability as well as the ceramic capillary membrane and the provision of the sufficiently gas-tight and high-temperature stable joint which serves for potting is introduced only into the said extension of the through-going apertures and does not form a continuous layer on the perforated plate.

The invention relates to a modular element comprising a high-temperature stable main body, the high-temperature stable main body including at least one metallic or ceramic plate, which has at least one through-going aperture for the insertion of a ceramic capillary membrane and at least one potting in the form of a sufficiently gas-tight and high-temperature stable joint between the metallic or ceramic plate and the at least one ceramic capillary membrane, the at least one through-going aperture of the at least one metallic or ceramic plate having an extension for accommodating the sufficiently gas-tight and high-temperature stable joint on at least one side of the metallic or ceramic plate.

The term 'adequately temperature-stable' is to be understood as the stability up to the melting point. The term 'sufficiently gas-tight' in this application document defines the admissibility of leakage rates for a technical system. The definition of a maximally allowable leakage rate may, for example, be based on a safety analysis with regard to explosion limits or the like or the specification of achievable substance purities for a specific technological system. In the scope of the present invention the term 'ceramic capillary membrane' is to be understood as tight membranes for which the amount of gas which flows through the remaining porous structure of the membrane at a differential pressure of 1 bar is less than 30%, preferably less than 5%, of the gas amount permeating by way of ionic conduction under operating conditions. The unfired membranes are referred to as green membranes according to the present invention.

According to the present invention ceramic capillary membranes may be hollow fibres, for example, which are structures with a hollow interior whose external dimensions, i.e. diameter or linear dimensions, are arbitrary. The hollow fibres may be of any cross-section desired as, for example, angular, elliptical or, in particular, circular. In addition, the hollow fibres may be coated with a suitable material.

In an embodiment of the invention the at least one metallic or ceramic plate is 0.5 to 50 mm thick and is provided with at least one through-going aperture which is of 1.2 to 2.9 times the cross-sectional area of the ceramic capillary membrane. The ceramic capillary membrane is preferably of an external cross-section area of 0.5 to 5 mm. The through-going aperture of the metallic or ceramic plate is advantageously in the form of a bore hole or punch hole.

In an exemplary mode, table 1 below shows the optimum area factors in dependence of the cross-sectional area of the ceramic capillary membrane for a circular through-going aperture and a square through-going aperture:

TABLE 1

| | Membrane diameter [mm] | | | | | | | | |
|---|---|---|---|---|---|---|---|---|---|
| | 1 | 1 | 1 | 2 | 2 | 2 | 3 | 3 | 3 |
| | | | | | Area factor | | | | |
| | 1 | 1.1 | 1.5 | 1 | 1.1 | 1.5 | 1 | 1.1 | 1.5 |
| Circular area, mm$^2$ | 0.79 | 0.95 | 1.77 | 3.14 | 3.80 | 7.07 | 7.07 | 8.55 | 15.90 |
| Square area, mm$^2$ | 1.00 | 1.21 | 2.25 | 4.00 | 4.84 | 9.00 | 9.00 | 10.89 | 20.25 |
| Area factor, circle | | 1.21 | 2.25 | | 1.21 | 2.25 | | 1.21 | 2.25 |
| Area factor, square | | 1.54 | 2.86 | | 1.54 | 2.86 | | 1.54 | 2.86 |

It is of advantage if the extension of the at least one through-going aperture of the metallic or ceramic plate is of a cross-sectional area of 2.5 to 20 times the cross-sectional area of the ceramic capillary membrane. The extension of the at least one through-going aperture in the metallic or ceramic plate is preferably conical, spherical, elliptical, star-shaped, pyramidal, funnel-shaped, trumpet-shaped or bell-shaped or is in the form of a countersunk cone.

Preferably the at least one metallic or ceramic plate has a thickness of 5 mm and is provided with at least one through-going circular aperture, which has a diameter of 1.1 to 1.5 times the diameter of a circular ceramic capillary membrane, the circular, conical extension having a diameter of 1.5 to 4 times the diameter of a circular ceramic capillary membrane and a height of 2 mm.

In an advantageous embodiment of the invention the sufficiently gas-tight and high-temperature stable joint is made of 10-80 mg, preferably 45 to 55 mg of a glass ceramics.

Optionally the at least one metallic or ceramic plate is provided with 10 to 100,000 through-going apertures, preferably 50 to 5000 through-going apertures and particularly preferably 500 through-going apertures and most preferably 50 through-going apertures. Advantageously, the high-temperature stable main body preferably comprises two metallic or ceramic plates, at least one of which is mounted in a floating manner. Optionally it is also possible to arrange both metallic or ceramic plates on one side of the modular element.

The ideal spacing of the through-going apertures of the metallic or ceramic plate results from the determination of the enveloping circle diameter. Here, a square as well as a triangular pitch of the metallic or ceramic plate is possible. In the case of a square pitch of the through-going apertures, this may be done such that the flow angle is 45° or 90°. With a triangular pitch, 30° or 60° flows are conceivable. The enveloping circle diameter $D_H$ can be estimated by the following formula:

$$D_H = \sqrt{b_1 \cdot z \cdot t_2 + f_2 \cdot \sqrt{z} \cdot t} + d_a.$$

Constant $f_1$ has the value 1.1 for a triangular and 1.3 for a square pitch. Constant $t_2$ may be taken from tables available to the person skilled in the art from, for example, VDI Heat Atlas, 2006 edition. $d_A$ denotes the fibre diameter in mm, z is the number of fibres and t the pitch in mm.

It is now possible to determine the optimum number of fibres z by means of the above equation. Table 2 below serves to show such a calculation in an exemplary mode. Assumed is a triangular pitch of 60°, the flow being axially parallel to the capillary fibres in co-current or counter-current flow.

In another embodiment of the invention the high-temperature stable main body preferably comprises two metallic or ceramic plates. Optionally the two metallic or ceramic plates of the high-temperature stable main body are opposed to each other and are inclined at an angle of 0 to 179 degrees.

Optionally it is also possible to arrange both metallic or ceramic plates on one side of the modular element.

A further claim is that the at least one metallic or ceramic plate of the high-temperature stable main body is mounted in a floating manner.

According to the invention the high-temperature stable main body of the modular element has an arbitrary type of geometric cross-section and is preferably of cylindrical shape. Preferably the high-temperature stable main body is of a material selected from a group which comprises ceramics, glass ceramics and metallic alloys. The high-temperature stable metallic alloy is preferably on a Ni basis.

A further possible configuration of the invention is that the high-temperature stable main body has at least one metallic capillary which is introduced into the at least one through-going aperture of the at least one metallic or ceramic plate, the at least one potting in the form of a sufficiently gas-tight and high-temperature stable joint between the metallic or ceramic plate and the least one metallic capillary is made of an alloy, the at least one metallic capillary incorporating the at least one ceramic capillary membrane and the at least one metallic capillary having an extension on at least one end for accommodating a sufficiently gas-tight and high-temperature stable joint, which is made of a glass ceramics.

In an embodiment of the invention the at least one sufficiently gas-tight and high-temperature stable joint between the metallic or ceramic plate and the potting in the form of at least one ceramic capillary membrane is made of a glass ceramics which contains 20-45 mole % BaO, 40-60 mole % $SiO_2$, 0-30 mole % ZnO, 0-10 mole % $Al_2O_3$, 0-5 mole % $BaF_2$, 0-2 mole % MgO, 0-2 mole % CaO, 0-2 mole % $TiO_2$, 0-10 mole % $B_2O_3$ and 0.5-4 mole % $M_2O_3$ (M=Y, La or rare earth metals) and/or 0.5-4 mole % $ZrO_2$. Preferably used is a glass ceramics of the following composition: 26 weight % BaO, 54 weight % $SiO_2$, 1 weight % $B_2O_3$, 1 weight % $ZrO_2$, 1 weight % $La_2O_3$ and 17 weight % ZnO. Particularly preferably used is a glass ceramics of the following composition: 36.25 weight % BaO, 44.25 weight % $SiO_2$, 5.0 weight % $B_2O_3$, 2.0 weight % $ZrO_2$, 2.0 weight % $La_2O_3$, 2.0 weight % $BaF_2$, 7.5 weight % $Al_2O_3$ and 1.0 weight % MgO.

In a preferred embodiment the at least one ceramic capillary membrane is made of an oxide ceramics which is pref-

TABLE 2

Determination of the optimum maximum number of fibres z

| | | Geometry Max. number of fibres z Fibre diameter $d_A$ [mm] | | | | | | | | | | | | |
|---|---|---|---|---|---|---|---|---|---|---|---|---|---|---|
| | | 1 | | | | | 2 | | | | 3 | | | |
| Extension | | 1.5 × $d_A$ | 2.0 × $d_A$ | 2.5 × $d_A$ | 3.0 × $d_A$ | 4.0 × $d_A$ | 1.25 × $d_A$ | 1.5 × $d_A$ | 2.0 × $d_A$ | 2.5 × $d_A$ | 3.0 × $d_A$ | 1.25 × $d_A$ | 1.5 × $d_A$ | 2.0 × $d_A$ | 2.5 × $d_A$ |
| Pitch t [mm] (minimum) | | 1.5 | 2 | 2.5 | 3 | 4 | 2.5 | 3 | 4 | 5 | 6 | 3.75 | 4.5 | 6 | 7.5 |
| Plate $D_H$ [mm] | 15 | 79 | 44 | 28 | 19 | 11 | 28 | 19 | 11 | 7 | 4 | 12 | 8 | 4 | 3 |
| | 25 | 232 | 130 | 83 | 58 | 32 | 83 | 58 | 32 | 20 | 14 | 37 | 25 | 14 | 9 |
| | 40 | 613 | 344 | 220 | 153 | 86 | 220 | 153 | 86 | 55 | 38 | 98 | 68 | 38 | 24 |
| | 50 | 967 | 544 | 348 | 241 | 136 | 348 | 241 | 136 | 87 | 60 | 154 | 107 | 60 | 38 | erably of a perovskite structure, a brownmillerite structure, an Aurivillius structure or a composite structure. Composite structure is to be understood as a ceramic capillary membrane which is provided with a coating. Such coating may combine different ceramic and non-ceramic materials.

The expansion coefficients of all the materials used are preferably similar or equivalent to the expansion coefficient of the at least one ceramic capillary membrane.

An exemplary measurement of the thermal expansion coefficients according to a method known to the person skilled in the art is shown in FIG. 1 covering a temperature range between 400° C. and 800° C. Here, graph "a" represents the ceramic capillary membrane to which the thermal expansion coefficient of the other materials is to be adapted. In this case the latter ranges between $14*10^{-6}$ $K^{-1}$ and $15*10^{-6}$ $K^{-1}$. Graph "b" in this figure represents the high-temperature stable main body and graph "c" represents the thermal expansion coefficient for the temperature of the sufficiently gas-tight and high-temperature stable joint. The ceramic capillary membrane used in this measurement was made of the material $BaCo_{0.40}Fe_{0.48}Zr_{0.12}O_{3-\delta}$. The main body was made of material 2.4633 (trade name: Nicrofer 6025 H/HT or alloy 602/602CA) and the sufficiently gas-tight and high-temperature stable joint was of the following composition: 36.25 weight % BaO, 44.25 weight % $SiO_2$, 5.0 weight % $B_2O_3$, 2.0 weight % $ZrO_2$, 2.0 weight % $La_2O_3$, 2.0 weight % $BaF_2$, 7.5 weight % $Al_2O_3$ and 1.0 weight % MgO.

It is of further advantage if all used materials which are in contact with the at least one ceramic capillary membrane are of sufficient chemical inertness vis-à-vis the at least one ceramic capillary membrane. Sufficiently chemical inert is to be understood as the reversible process of the structural change of the membrane.

The relevant process for the fabrication of a modular element in accordance with the invention comprises the following steps:

Fabrication of a high-temperature stable main body:
a) activation by etching or roughening of the at least one ceramic capillary membrane in the intended area of contact between the ceramic capillary membrane, the sufficiently gas-tight and high-temperature stable joint and the metallic or ceramic plate,
b) application of a protective coat of inert ceramic or metallic materials in a single or several layer/s onto the ceramic capillary membrane in the intended area of contact between the ceramic capillary membrane, the sufficiently gas-tight and high-temperature stable joint and the metallic or ceramic plate,
c) pre-treatment of the metallic or ceramic plate by etching, roughening or thermal pre-oxidation in the intended area of contact between the ceramic capillary membrane, the sufficiently gas-tight and high-temperature stable joint and the metallic or ceramic plate,
d) processing of an amorphous glass powder with additives to obtain a casting slip,
e) application of the casting slip onto the intended area of contact between the ceramic capillary membrane, the sufficiently gas-tight and high-temperature stable joint and the metallic or ceramic plate,
f) insertion of at least one ceramic capillary membrane into the at least one through-going aperture of the at least one metallic or ceramic plate of the high-temperature stable main body, and
g) sintering.

If appropriate, the individual process steps for the fabrication of the high-temperature stable main body may be interchanged in a suitable order and/or repeated. Sintering is advantageously performed at various suitable points of the process for the fabrication of the high-temperature stable main body. This means that the ceramic capillary membrane can be used in the sintered as well as in the green state; this also applies to the metallic or ceramic plate.

In an advantageous embodiment of the process, a protective coat of preferably precious metals and particularly preferably Au is applied onto the ceramic capillary membrane in the intended area of contact between the ceramic capillary membrane, the sufficiently gas-tight and high-temperature stable joint and the metallic or ceramic plate for the fabrication of the high-temperature stable main body.

In another embodiment of the process, the thermal pre-oxidation in the fabrication of the high-temperature stable main body is performed in air atmosphere at 800° C. to 1000° C. over a period of 36 to 60 hours.

The additives for processing the amorphous glass powder are advantageously selected from a group including polyvinyl alcohols, polyethylene glycol, polyvinyl pyrrolidone and agar for the fabrication of the high-temperature stable main body.

Further embodiments of the process relate to the application of the casting slip onto the intended area of contact between the ceramic capillary membrane, the sufficiently gas-tight and high-temperature stable joint and the metallic or ceramic plate. In a first process variant the ceramic capillary membranes are individually provided with at least one plug of casting slip, while rotating. In a further process variant the ceramic capillary membranes are inserted into a casting mould and provided with at least one plug of casting slip. Another possibility of applying the casting slip is to cast or injection-mould the plugs of casting slip and then line them up on the ceramic capillary membranes. Optionally the casting slip is cast into the at least one extension of the through-going aperture of the at least one metallic or ceramic plate and then perforated.

In a preferred embodiment of the invention, 10-80 mg, preferably 45 to 55 mg of the casting slip are applied onto the intended area of contact between the ceramic capillary membrane, the sufficiently gas-tight and high-temperature stable joint and the metallic or ceramic plate.

In a further embodiment of the process, casting slip is again applied onto the intended area of contact between the ceramic capillary membrane, the sufficiently gas-tight and high-temperature stable joint and the metallic or ceramic plate after process steps 1a) to g) have been completed, the area of contact being located on the opposite side of the potting resulting from process steps 1a) to g), subsequently to which another sintering step is carried out. This method involves the advantage that it is still possible to eliminate any remaining leaks. Optionally this procedure may be repeated several times.

Furthermore the process may be configured such that the high-temperature stable main bodies are sintered in vertical or horizontal position during fabrication. The sintering process is advantageously performed in a controlled argon atmosphere with 0.05 to 0.2% oxygen by means of a defined temperature increase and temperature decrease in a range from ambient temperature to the sintering temperature of the casting slip which is below the melting temperature of the ceramic capillary membrane, the heating rate being within a range of 0.5-2 K/min. The preferred sintering temperature ranges between 950° C. and 1100° C.

The invention further claims a device comprising at least one modular element in accordance with the invention.

The invention is illustrated in more detail by means of the following exemplary five figures:

FIG. 1: Exemplary measurement of the thermal expansion coefficients in a temperature range between 400° C. and 800° C.

Figure 2:
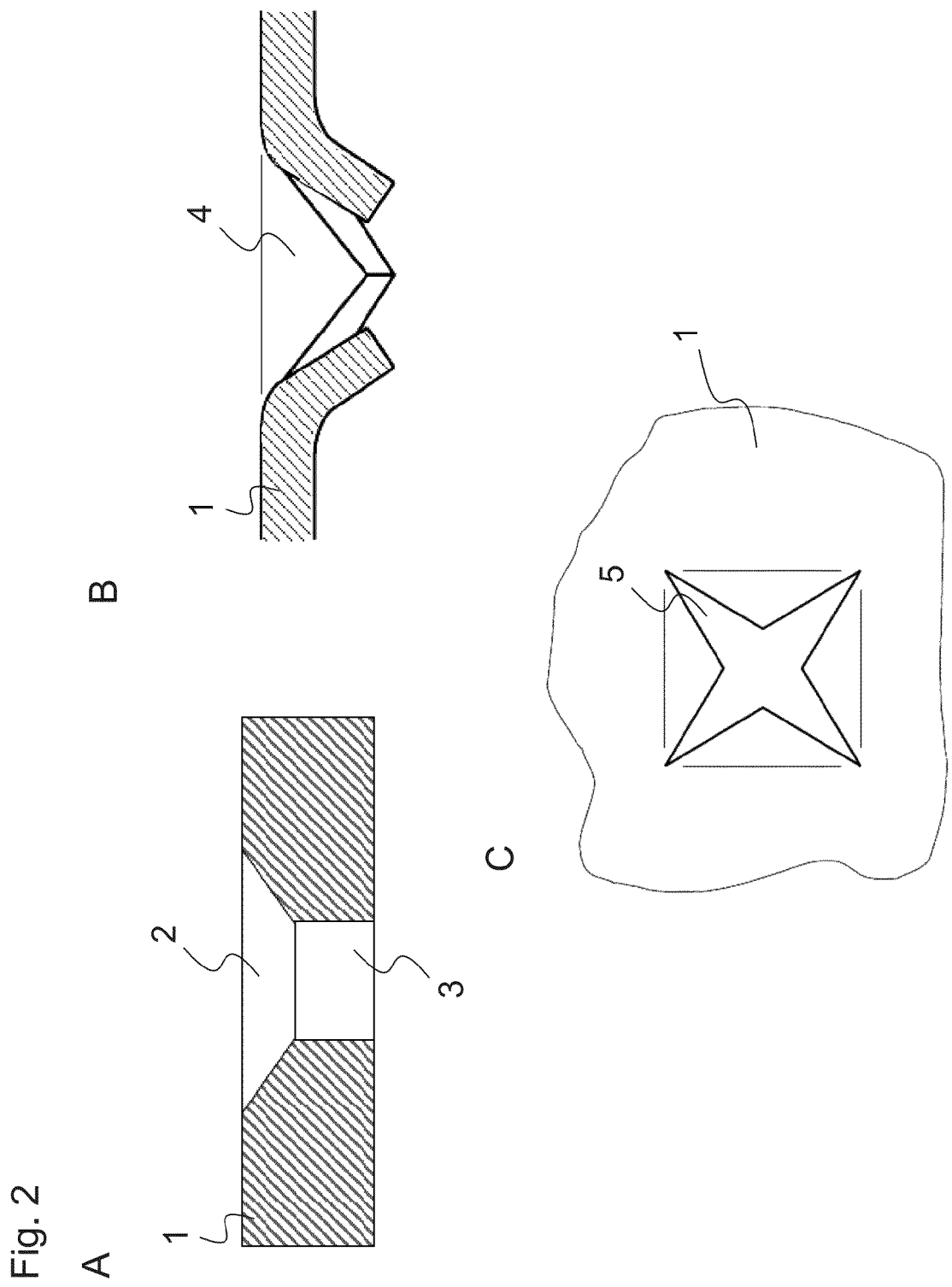

FIG. 2: Inventive embodiments of a through-going aperture provided with an extension in the metallic or ceramic plate.

Figure 3:
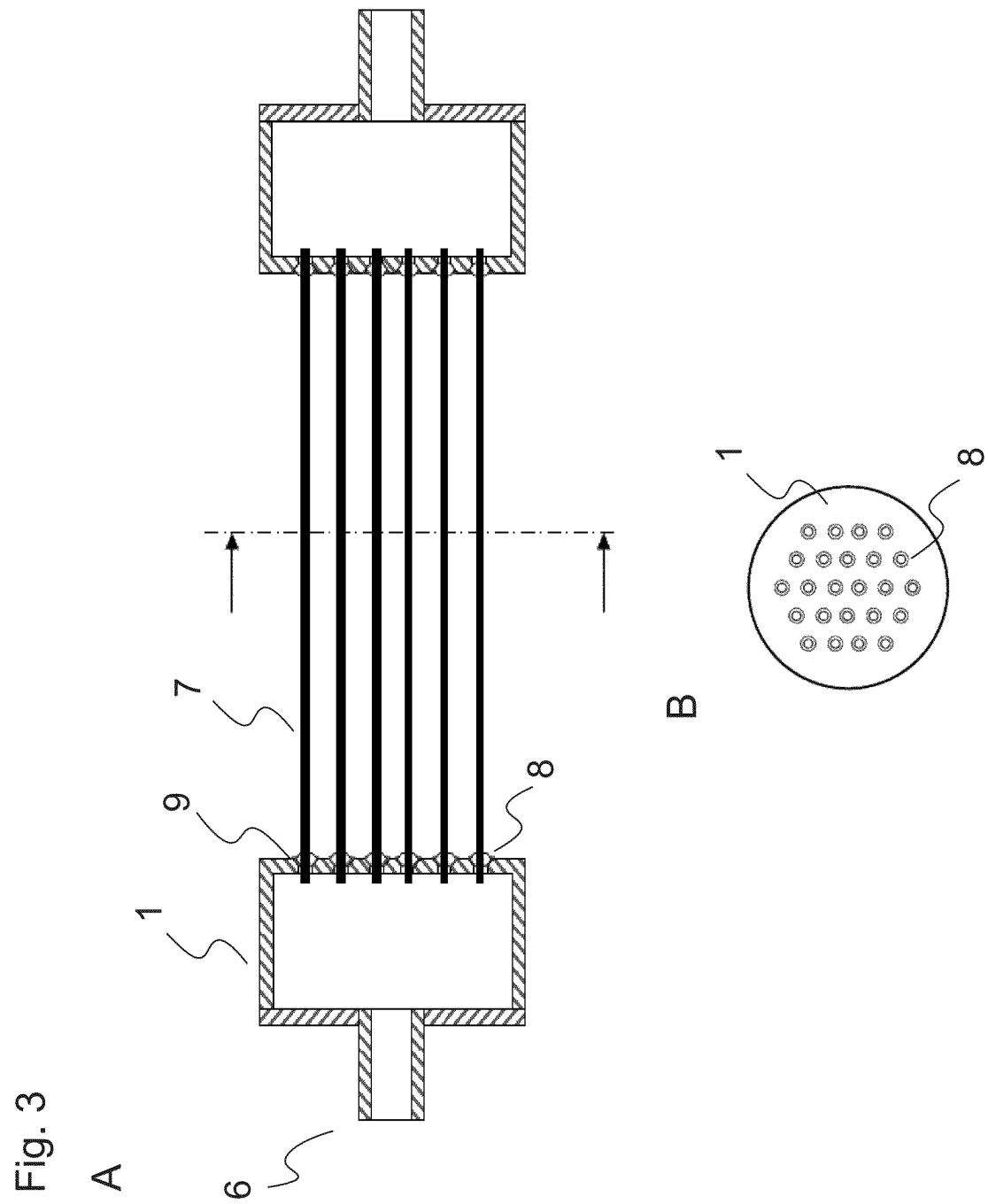

FIG. 3: Cross-section of a high-temperature stable main body with ceramic capillary membranes provided with a potting on two sides.

Figure 4:
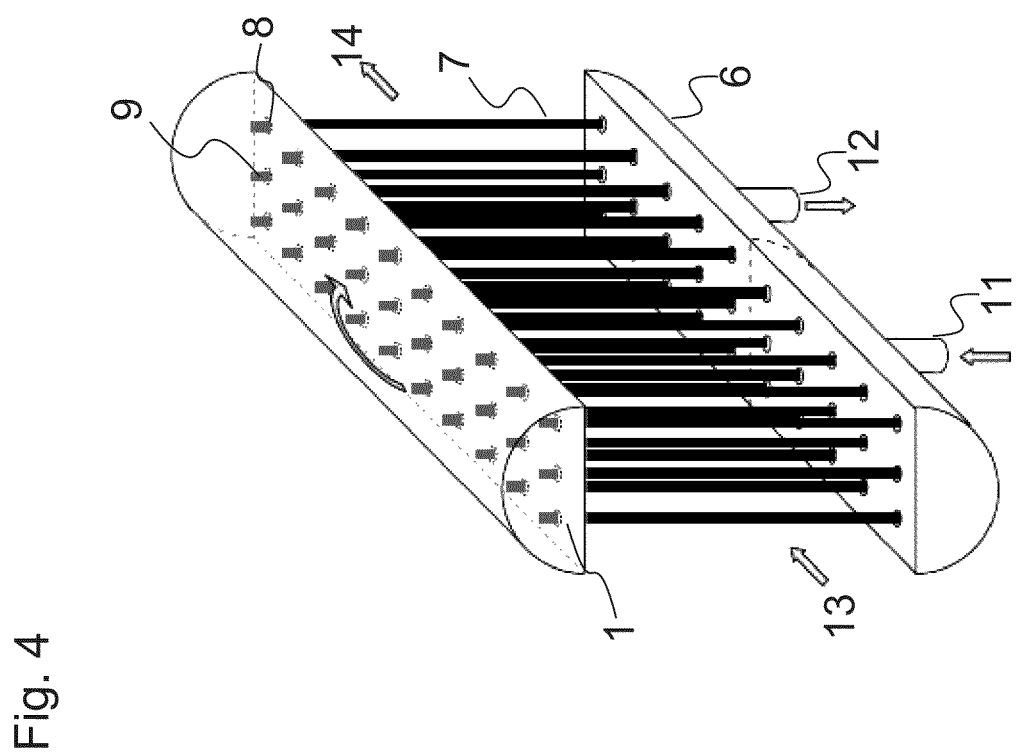

FIG. 4: Modular element with ceramic capillary membranes provided with a potting on two sides, the modular element being mounted in a floating manner on one side.

Figure 5:
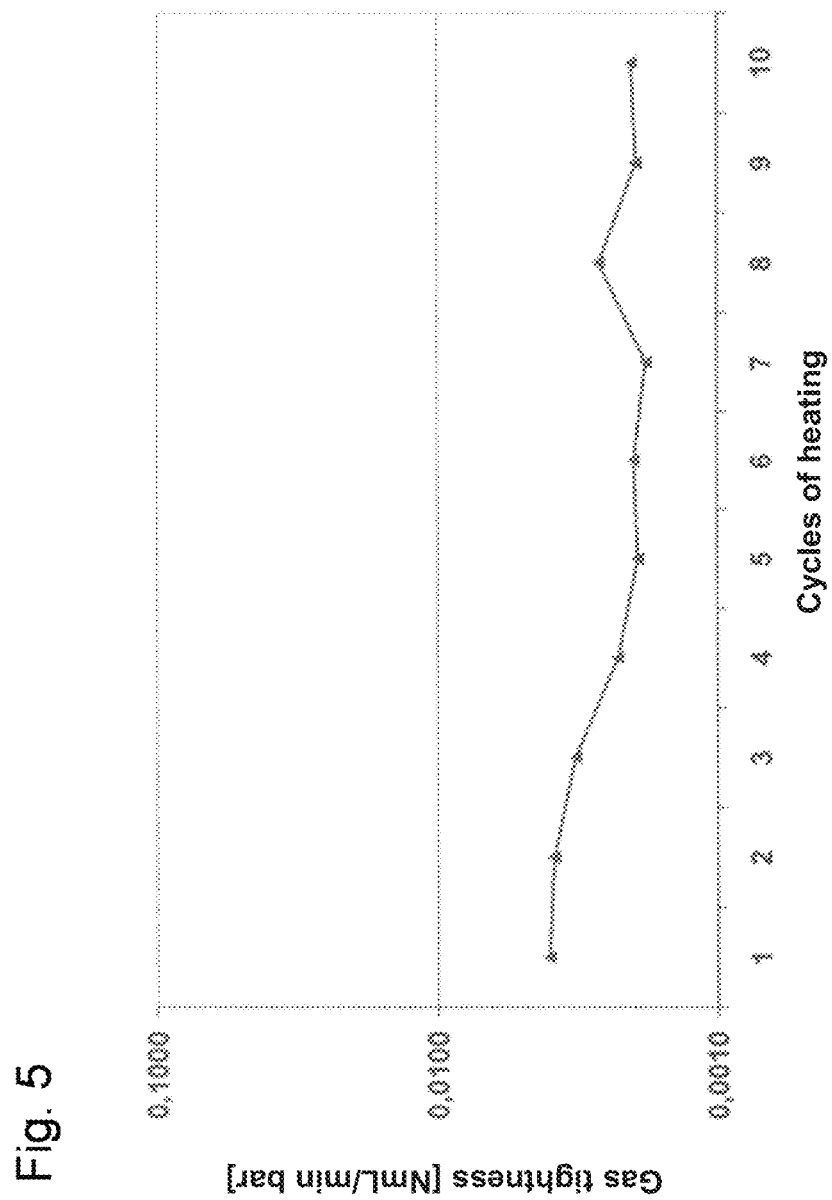

FIG. 5: Gas-tightness of the bond between the ceramic capillary membrane, the sufficiently gas-tight and high-temperature stable joint and the high-temperature stable main body after repeating a cycle of heating to 850° C. and cooling to 100° C. ten times.

FIG. 2 shows different embodiments of a through-going aperture in the metallic or ceramic plate. FIG. 2A, for example, shows a through-going aperture which is integrated as borehole 3, the extension being provided as countersunk cone 2 in the metallic or ceramic plate 1. FIG. 1B shows a punched through-going aperture 4 which is incorporated into the metallic or ceramic plate 1. FIG. 2C shows a plan view of a metallic or ceramic plate 1 provided with a through-going aperture, in this example, in the form of a star 5.

FIG. 3A shows a cross-section through a high-temperature stable main body 6 which, in this example, consists of two metallic or ceramic plates 1, which are provided with through-going apertures 8. Capillary membranes 7 are inserted through the said through-going apertures 8, through-going apertures 8 including a sufficiently gas-tight and high-temperature stable joint 9 in the extension of through-going apertures 8. In this way, sufficiently gas-tight and high-temperature stable joint 9, which joins ceramic capillary membranes 7 with high-temperature stable main body 6, is only located in the extensions of through-going apertures 8 so that the potting is provided at certain points only which is of positive effect on the stability of such a main body. FIG. 3B shows a plan view of a metallic or ceramic plate 1, which is provided with through-going apertures 8 which are, in turn, provided with extensions for accommodating a sufficiently gas-tight and high-temperature stable joint.

FIG. 4 shows a modular element in accordance with the invention. High-temperature stable main body 6, the design of which is shown in FIG. 3, is fitted with a gas inlet 11 for the entry of an oxygenated gas which consists of air, $H_2O$ or $N_2O$, for example. At a pressure of approx. 4 bar the oxygenated gas flows into ceramic capillary membranes 7, the oxygen being transferred in ionic form through ceramic capillary membranes 7, thus achieving a highly selective separation of the oxygen from the oxygenated gas. The oxygen-depleted gas is removed again from the modular element through gas outlet 12. The oxygen thus recovered can then react with methane 13, for example, by which a driving gradient is maintained for the oxygen permeation on account of the continuous consumption of oxygen. This reaction which is carried out at a temperature of 850° C. yields syngas 14.

FIG. 5 shows the gas-tightness of a bond between ceramic capillary membrane, the sufficiently gas-tight and high-temperature stable joint and the high-temperature stable main body after repeating a cycle of heating up to 850° C. and cooling down to 100° C. ten times. The figure shows an insignificant deterioration of the leakage rate even after a ten-time repetition of the heating and cooling cycle. This underlines the substantial progress achieved in the joining techniques applied in the fabrication of modular elements.

The joining produced according to the invention can be operated over a period of 1000 hours at operating temperature and a pressure difference of 6 bar between the two joined sides. The leakage rate determined over the whole period is below 1%. This corresponds to a purity of the oxygen separated via the membrane of >95%.

Alternatively the modular element may also consist of a main body with ceramic capillary membranes potted on one side only.

Advantages involved in the invention:
improved oxygen transfer rates
reduced leakage rates of the bond between the ceramic capillary membrane, the sufficiently gas-tight and high-temperature stable joint and the high-temperature stable main body
increased long-term stability in operation
mechanically stable under thermal cycling stress in heating and cooling processes
no or negligible chemical reactivity between the ceramic capillary membrane, the sufficiently gas-tight and high-temperature stable joint and the high-temperature stable main body.

| List of reference numbers and designations | |
|---|---|
| 1 | Metallic or ceramic plate |
| 2 | Countersunk cone |
| 3 | Borehole |
| 4 | Punched through-going aperture |
| 5 | Star-shaped through-going aperture |
| 6 | High-temperature stable main body |
| 7 | Ceramic capillary membranes |
| 8 | Through-going apertures |
| 9 | Sufficiently gas-tight and high-temperature stable joint |
| 11 | Gas inlet |
| 12 | Gas outlet |
| 13 | Methane |
| 14 | Syngas |

LIST OF REFERENCE NUMBERS AND DESIGNATIONS

1 Metallic or ceramic plate
2 Countersunk cone
3 Borehole
4 Punched through-going aperture
5 Star-shaped through-going aperture
6 High-temperature stable main body
7 Ceramic capillary membranes
8 Through-going apertures
9 Sufficiently gas-tight and high-temperature stable joint
11 Gas inlet
12 Gas outlet
13 Methane
14 Syngas

The invention claimed is:
1. A modular element, comprising;
i) a high-temperature stable main body;
ii) the high-temperature stable main body including at least one metallic or ceramic plate, which has at least one through-going aperture for the insertion of a ceramic capillary membrane and a thickness of 0.5 to 50 mm; and
iii) at least one potting in the form of a sufficiently gas-tight and high-temperature stable joint between the metallic or ceramic plate and the at least one ceramic capillary membrane, wherein the at least one through-going aperture of the at least one metallic or ceramic plate has an extension for accommodating the sufficiently gas-tight and high-temperature stable joint on at least one side of the metallic or ceramic plate, with the through-going aperture being of a cross-sectional area of 1.2 to 2.9 times the cross-sectional area of the ceramic capillary membrane and the extension being of a cross-sectional area of 2.5 to 20 times the cross-sectional area of the ceramic capillary membrane, and the sufficiently gas-tight and high-temperature stable joint being introduced only into the respective extension of the through-going aperture and not forming a continuous layer on the at least one metallic or ceramic plate.

2. The modular element of claim 1, wherein the at least one through-going aperture of the metallic or ceramic plate is in the form of a bore hole or punch hole.

3. The modular element of claim 1, wherein the extension of the at least one through-going aperture in the metallic or ceramic plate is conical, spherical, elliptical, star-shaped, pyramidal, funnel-shaped, trumpet-shaped, bell-shaped or is in the form of a countersunk cone.

4. The modular element of claim 1, wherein the at least one metallic or ceramic plate has a thickness of 5 mm and is provided with at least one through-going aperture, which has a diameter of 1.1 to 1.5 times the diameter of a circular ceramic capillary membrane, the circular, conical extension having a diameter of 1.5 to 4 times the diameter of a circular ceramic capillary membrane and a height of 2 mm.

5. The modular element of claim 1, wherein the sufficiently gas-tight and high-temperature stable joint is made of 10-80 mg of a glass ceramic.

6. The modular element of claim 1, wherein the at least one metallic or ceramic plate is provided with 10 to 100,000 through-going apertures.

7. The modular element of claim 1, wherein the high-temperature stable main body comprises two metallic or ceramic plates.

8. The modular element of claim 7, wherein the two metallic or ceramic plates of the high-temperature stable main body are opposed to each other and are inclined at an angle of 0 to 179 degrees.

9. The modular element of claim 7, wherein both metallic or ceramic plates are arranged on one side of the modular element.

10. The modular element of claim 1, wherein the at least one metallic or ceramic plate of the high-temperature stable main body is mounted in a floating manner.

11. The modular element of claim 1, wherein the high-temperature stable main body has a cylindrical shape.

12. The modular element according to claim 1, wherein the high-temperature stable main body is of a material selected from the group consisting of ceramics, glass ceramics and metallic alloys.

13. The modular element of claim 1, wherein the high-temperature stable main body has at least one metallic capillary which is introduced into the at least one through-going aperture of the at least one metallic or ceramic plate, the at least one potting in the form of a sufficiently gas-tight and high-temperature stable joint between the metallic or ceramic plate and the least one metallic capillary is made of an alloy, the at least one metallic capillary incorporating the at least one ceramic capillary membrane and the at least one metallic capillary having an extension on at least one end for accommodating a sufficiently gas-tight and high-temperature stable joint, which is made of a glass ceramic.

14. The modular element of claim 1, wherein the at least one sufficiently gas-tight and high-temperature stable joint between the metallic or ceramic plate and the potting in the form of at least one ceramic capillary membrane is made of a glass ceramic which contains 20-45 mole % BaO, 40-60 mole % $SiO_2$, 0-30 mole % ZnO, 0-10 mole % $Al_2O_3$, 0-5 mole % $BaF_2$, 0-2 mole % MgO, 0-2 mole % CaO, 0-2 mole % $TiO_2$, 0-10 mole % $B_2O_3$ and 0.5-4 mole % $M_2O_3$ (M=Y, La or rare earth metals) and/or 0.5-4 mole % $ZrO_2$.

15. The modular element of claim 14, wherein the at least one sufficiently gas-tight and high-temperature stable joint between the metallic or ceramic plate and the potting in the form of at least one ceramic capillary membrane is made of a glass ceramic which contains 26 weight % BaO, 54 weight % $SiO_2$, 1 weight % $B_2O_3$, 1 weight % $ZrO_2$, 1 weight % $La_2O_3$ and 17 weight % ZnO.

16. The modular element of claim 14, wherein the at least one sufficiently gas-tight and high-temperature stable joint between the metallic or ceramic plate and the potting in the form of at least one ceramic capillary membrane is made of a glass ceramic which contains 36.25 weight % BaO, 44.25 weight % $SiO_2$, 5.0 weight % $B_2O_3$, 2.0 weight % $ZrO_2$, 2.0 weight % $La_2O_3$, 2.0 weight % $BaF_2$, 7.5 weight % $Al_2O_3$ and 1.0 weight % MgO.

17. The modular element of claim 1, wherein the at least one ceramic capillary membrane is made of an oxide ceramic.

18. The modular element of claim 1, wherein the expansion coefficients of all the materials used are similar or equivalent to the expansion coefficient of the at least one ceramic capillary membrane.

19. The modular element of claim 1, wherein all materials which contact the at least one ceramic capillary membrane are chemically inert with respect to the at least one ceramic capillary membrane.

20. A process for the fabrication of a modular element of claim 1, comprising the following steps:
fabrication of a high-temperature stable main body:
a) activation by etching or roughening of the at least one ceramic capillary membrane in an intended area of contact between the ceramic capillary membrane, the sufficiently gas-tight and high-temperature stable joint and the metallic or ceramic plate,
b) application of a protective coating of inert ceramic or metallic materials in a single or several layer/s onto the ceramic capillary membrane in the intended area of contact between the ceramic capillary membrane, the sufficiently gas-tight and high-temperature stable joint and the metallic or ceramic plate,
c) pre-treatment of the metallic or ceramic plate by etching, roughening or thermal pre-oxidation in the intended area of contact between the ceramic capillary membrane, the sufficiently gas-tight and high-temperature stable joint and the metallic or ceramic plate,
d) processing of an amorphous glass powder with additives to obtain a casting slip,
e) application of the casting slip onto the intended area of contact between the ceramic capillary membrane, the sufficiently gas-tight and high-temperature stable joint and the metallic or ceramic plate,
f) insertion of the ceramic capillary membrane into the at least one through-going aperture of the at least one metallic or ceramic plate of the high-temperature stable main body, and
g) sintering.

21. The process for the fabrication of a modular element of claim 20, comprising applying, for the fabrication of the high-temperature stable main body, a protective coat of precious metal onto the ceramic capillary membrane in the intended area of contact between the ceramic capillary membrane, the sufficiently gas-tight and high-temperature stable joint and the metallic or ceramic plate.

22. The process for the fabrication of a modular element of claim 20, wherein the thermal pre-oxidation in the fabrication of the high-temperature stable main body is performed in air atmosphere at 800° C. to 1000° C. over a period of 36 to 60 hours.

23. The process for the fabrication of a modular element of claim 20 wherein, for the fabrication of the high-temperature stable main body, an additive for processing the amorphous glass powder is selected from the group consisting of polyvinyl alcohol, polyethylene glycol, polyvinyl pyrrolidone, and agar.

24. The process for the fabrication of a modular element of claim 20, wherein for the fabrication of the high-temperature stable main body, the ceramic capillary membranes are individually provided with at least one plug of casting slip, while rotating.

25. The process for the fabrication of a modular element of claim 20, wherein for the fabrication of the high-temperature stable main body, the ceramic capillary membranes are inserted into a casting mould and provided with at least one plug of casting slip.

26. The process for the fabrication of a modular element of claim 20, wherein for the fabrication of the high-temperature stable main body, the plugs of casting slip are cast or injection-moulded and then lined up on the ceramic capillary membranes.

27. The process for the fabrication of a modular element of claim 20, wherein for the fabrication of the high-temperature stable main body, the casting slip is cast into the at least one extension of the through-going aperture of the at least one metallic or ceramic plate and then perforated.

28. The process for the fabrication of a modular element of claim 20, wherein for the fabrication of the high-temperature stable main body, 10-80 mg of the casting slip are applied onto the intended area of contact between the ceramic capillary membrane, the sufficiently gas-tight and high-temperature stable joint and the metallic or ceramic plate.

29. The process for the fabrication of a modular element of claim 20, wherein casting slip is again applied onto the intended area of contact between the ceramic capillary membrane, the sufficiently gas-tight and high-temperature stable joint and the metallic or ceramic plate after process steps 1a) to g) have been completed, the area of contact being located on the opposite side of the potting resulting from process steps 1a) to g), subsequently to which another sintering step is carried out and the procedure may be repeated several times.

30. The process for the fabrication of a modular element of claim 20, wherein for the fabrication of the high-temperature stable main bodies, the latter are sintered in vertical or horizontal position.

31. The process for the fabrication of a modular element of claim 20, wherein for the fabrication of the high-temperature stable main bodies, the latter are sintered in a controlled argon atmosphere with 0.05 to 0.2% oxygen.

32. The process for the fabrication of a modular element of claim 31, wherein for the fabrication of the high-temperature stable main bodies, the latter are sintered by means of a defined temperature increase and temperature decrease in a range from ambient temperature to the sintering temperature of the casting slip which is below the melting temperature of the ceramic capillary membrane, the heating rate being within a range of 0.5-2 K/min.

33. The process for the fabrication of a modular element of claim 31, wherein the sintering temperature for the fabrication of the high-temperature stable main body ranges between 950° C. and 1100° C.

34. A device including at least one modular element of claim 1.

* * * * *